April 13, 1926.
R. B. FERGUSON
COTTER PIN
Filed May 15, 1925
1,580,239
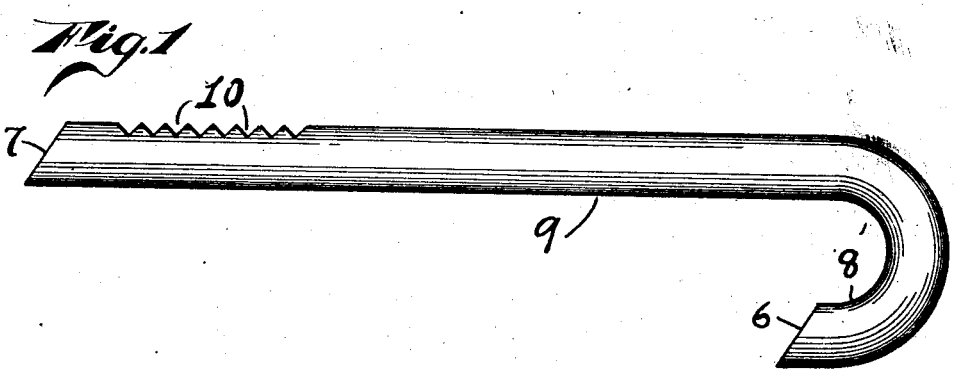
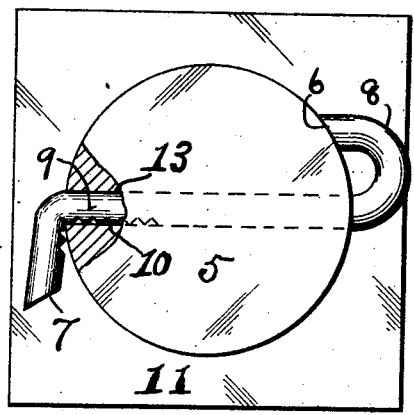
INVENTOR.
Robert B. Ferguson,
BY
ATTORNEY.

Patented Apr. 13, 1926.

1,580,239

UNITED STATES PATENT OFFICE.

ROBERT B. FERGUSON, OF LOS ANGELES, CALIFORNIA.

COTTER PIN.

Application filed May 15, 1925. Serial No. 30,526.

*To all whom it may concern:*

Be it known that I, ROBERT B. FERGUSON, a citizen of the United States, residing at the city of Los Angeles, county of Los Angeles, State of California, have invented new and useful Improvements in Cotter Pins, of which the following is a specification.

My invention relates to a pin that passes through a shaft or bolt to prevent an object thereon from disengaging from the shaft or bolt; and the object thereof is to provide a cotter pin that is simpler in construction and has greater strength than the cotter pin in common use. A further object is to provide a cotter pin which when positioned for use always retains its original position in the shaft or bolt and which can not accidentally work out of its original position.

In the drawings forming a part of this application Fig. 1 is a side elevation of a cotter pin illustrating my improved construction. Fig 2 is an end elevation of a bolt partly in section with one of my improved cotter pins positioned therein for use in holding a locking plate on the bolt, the pin being of a smaller size from that shown in Fig. 1.

Referring to the drawings, my improved cotter pin is formed preferably by cutting a piece of wire or rod of a diameter to fit into the hole in bolt 5 on the diagonal to form what I term wedge shaped ends 6 and 7. End 6 is bent to form a crook 8 with the face of the wedge facing the body 9 and on one side thereof and forms what I term a shepherd-crook-head. Near end 7 I form a plurality of notches 10 which are cut in the body 9 in any suitable manner, such as by a rotary file or a milling tool. When the plate 11 is positioned on bolt 5 adjacent to hole 13 therein, in which position it is desired to have plate 11 held, a cotter pin of the desired size, which includes diameter and length, and of the form shown in Fig. 1 is passed into hole 13 until the head abuts against the bolt. The operator with a hammer or other tool bends the projecting notched end of the pin in a direction opposite to the head. In so doing the body bends and stretches at the notch that registers with the edge of the surface of the bolt and that portion of the body at the apex of the next notch is projected against the surface of the bolt. At the same time the face of the head is positioned against the surface of the bolt on the opposite side thereof thus preventing any chattering of the pin in the hole and obviating any danger of the pin working out of the hole. While the body is preferably cylindrical, it may be of other shape in cross section.

Having described my invention I claim—

1. A cotter pin comprising a cylindrical body having a shepherd-crook-head at one end and notches in the body near the other end.

2. A cotter pin comprising a body having one end bent to form a semi-circular shaped head, a portion of the head lying in a plane parallel with the plane of the body, said body having notches near the other end of the body.

3. A cotter pin comprising a body having one end bent to form a semi-circular shaped head, the face of the head being wedge shaped and a portion of the head lying in a plane parallel with the plane of the body, and a portion of the body near the other end having notches therein, said last end being wedge shaped.

4. A cotter pin formed of a body whose ends are wedge shaped, one end of the body being bent to form a semi-circular-shaped head lying at one side of the longitudinal plane of the body and the body having notches therein near the end opposite the head.

5. A cotter pin comprising a body provided with a head at one end to prevent the body passing through a hole in a bolt, said body having notches in the side near the other end, said notches being adjacent to the edge of the bolt in which the pin is positioned for use and forming a weakened point at which the pin may be bent to cause the protruding end to lock the pin from accidental separation from the bolt.

In witness that I claim the foregoing I have hereunto subscribed my name May, 1925.

ROBERT B. FERGUSON.